United States Patent
Kang

(10) Patent No.: US 10,694,018 B2
(45) Date of Patent: Jun. 23, 2020

(54) METHOD AND APPARATUS FOR CONTROLLING RUNNING STATUS OF WEARABLE ELECTRONIC DEVICE

(71) Applicant: Huawei Technologies Co., Ltd., Shenzhen (CN)

(72) Inventor: Junteng Kang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/093,852

(22) PCT Filed: Apr. 13, 2016

(86) PCT No.: PCT/CN2016/079144
§ 371 (c)(1),
(2) Date: Oct. 15, 2018

(87) PCT Pub. No.: WO2017/177394
PCT Pub. Date: Oct. 19, 2017

(65) Prior Publication Data
US 2019/0109936 A1    Apr. 11, 2019

(51) Int. Cl.
*H04W 4/00* (2018.01)
*H04M 1/725* (2006.01)
(Continued)

(52) U.S. Cl.
CPC ........ *H04M 1/72527* (2013.01); *G06F 1/163* (2013.01); *G06F 1/1694* (2013.01);
(Continued)

(58) Field of Classification Search
None
See application file for complete search history.

(56) References Cited

U.S. PATENT DOCUMENTS 9,557,716 B1 *  1/2017  Inamdar ................. G04G 17/06
9,606,376 B2 *  3/2017  Filutowski ............. G02C 11/10
(Continued)

FOREIGN PATENT DOCUMENTS

CN    102348068 A    2/2012
CN    103414988 A    11/2013
(Continued)

OTHER PUBLICATIONS

Foreign Communication From a Counterpart Application, European Application No. 16898213.0, Extended European Search Report dated Jan. 28, 2019, 8 pages.
(Continued)

*Primary Examiner* — Tuan A Tran
(74) *Attorney, Agent, or Firm* — Conley Rose, P.C.

(57) ABSTRACT

A method and an apparatus for controlling a running status of a wearable electronic device, where the method includes determining a posture of a wearable electronic device, where the posture includes a stationary posture and a moving posture, and controlling a running status of the wearable electronic device according to the posture. According to the method and the apparatus for controlling a running status of a wearable electronic device, the posture of the wearable electronic device is monitored using, for example, a gyroscope signal from a mobile phone, whether a user is using the wearable electronic device is determined, and the running status of the wearable electronic device is determined without using a light sensor, which reduces manufacturing costs of the wearable electronic device.

20 Claims, 4 Drawing Sheets

(51) Int. Cl.
*G06F 1/16* (2006.01)
*G06F 3/01* (2006.01)
*G06F 1/3234* (2019.01)
*G06F 1/3203* (2019.01)
*G06F 3/03* (2006.01)
*G06F 1/3287* (2019.01)
*G06F 3/041* (2006.01)

(52) U.S. Cl.
CPC ............ *G06F 1/3203* (2013.01); *G06F 1/325* (2013.01); *G06F 1/3287* (2013.01); *G06F 3/011* (2013.01); *G06F 3/012* (2013.01); *G06F 3/017* (2013.01); *G06F 3/0304* (2013.01); *G06F 3/0416* (2013.01); *H04M 2250/12* (2013.01)

(56) References Cited

U.S. PATENT DOCUMENTS

| | | | | |
|---|---|---|---|---|
| 9,750,433 | B2* | 9/2017 | Hu | A61B 5/002 |
| 9,788,138 | B2* | 10/2017 | Miller | H04W 4/70 |
| 9,793,981 | B2* | 10/2017 | Lee | G06F 1/1694 |
| 9,795,313 | B2* | 10/2017 | Kim | A61B 5/1126 |
| 9,813,864 | B2* | 11/2017 | Dvortsov | H04W 4/023 |
| 9,854,529 | B2* | 12/2017 | Ludwig | H04W 52/0254 |
| 2013/0072765 | A1 | 3/2013 | Kahn et al. | |
| 2015/0338926 | A1 | 11/2015 | Park et al. | |
| 2016/0018872 | A1 | 1/2016 | Tu et al. | |
| 2016/0077547 | A1 | 3/2016 | Aimone et al. | |
| 2016/0104037 | A1* | 4/2016 | Li | G06K 9/00335 348/77 |
| 2016/0277891 | A1* | 9/2016 | Dvortsov | H04W 4/023 |
| 2016/0295010 | A1* | 10/2016 | Miller | H04W 4/70 |
| 2016/0351171 | A1 | 12/2016 | Xu | |
| 2018/0033278 | A1* | 2/2018 | Nguyen | G08B 21/043 |
| 2018/0103432 | A1* | 4/2018 | Ludwig | H04W 52/0254 |

FOREIGN PATENT DOCUMENTS

| | | |
|---|---|---|
| CN | 103760945 A | 4/2014 |
| CN | 104808923 A | 7/2015 |
| CN | 105320277 A | 2/2016 |
| CN | 205007551 U | 2/2016 |
| CN | 105373227 A | 3/2016 |
| CN | 105429247 A | 3/2016 |
| CN | 105467591 A | 4/2016 |
| JP | 2015011368 A | 1/2015 |

OTHER PUBLICATIONS

Machine Translation and Abstract of Chinese Publication No. CN102348068, Feb. 8, 2012, 12 pages.
Machine Translation and Abstract of Chinese Publication No. CN103414988, Nov. 27, 2013, 11 pages.
Machine Translation and Abstract of Chinese Publication No. CN103760945, Apr. 30, 2014, 19 pages.
Machine Translation and Abstract of Chinese Publication No. CN105373227, Mar. 2, 2016, 31 pages.
Machine Translation and Abstract of Chinese Publication No. CN205007551, Feb. 3, 2016, 13 pages.
Machine Translation and Abstract of Japanese Publication No. JP2015011368, Jan. 19, 2015, 17 pages.
Foreign Communication From a Counterpart Application, PCT Application No. PCT/CN2016/079144, English Translation of International Search Report dated Jan. 17, 2017, 3 pages.
Foreign Communication From a Counterpart Application, PCT Application No. PCT/CN2016/079144, English Translation of Written Opinion dated Jan. 17, 2017, 5 pages.
Machine Translation and Abstract of Chinese Publication No. CN105429247, Mar. 23, 2016, 11 pages.
Machine Translation and Abstract of Chinese Publication No. CN105467591, Apr. 6, 2016, 11 pages.
Foreign Communication From a Counterpart Application, Chinese Application No. 201680017546.5, Chinese Office Action dated Aug. 5, 2019, 9 pages.

* cited by examiner

300

Determine a posture change status of a wearable electronic device — S310

Control a running status of the wearable electronic device according to the posture change status — S320

METHOD AND APPARATUS FOR CONTROLLING RUNNING STATUS OF WEARABLE ELECTRONIC DEVICE

CROSS-REFERENCE TO RELATED APPLICATIONS

This application is a U.S. National Stage of International Patent Application No. PCT/CN2016/079144 filed on Apr. 13, 2016, which is hereby incorporated by reference in its entirety.

TECHNICAL FIELD

The present invention relates to the field of electronic devices, and in particular, to a method and an apparatus for controlling a running status of a wearable electronic device.

BACKGROUND

A wearable electronic device, such as virtual reality (Virtual Reality, VR) glasses, uses a display to block people's vision of the real outside world and enable a user to experience an immersive virtual environment, so as to provide a real three-dimensional visual effect for the user. To enable a wearable electronic device to have a longer battery endurance time, whether the wearable electronic device is controlled to enter a standby state needs to be determined according to a status of using the wearable electronic device by a user. In the prior art, a usage status of a user is monitored by using a light sensor. However, a light sensor costs a lot.

Therefore, a technology is expected to reduce costs of controlling a running status of a VR device.

SUMMARY

Embodiments of the present invention provide a method and an apparatus for controlling a running status of a wearable electronic device, and a wearable electronic device, so as to reduce costs of a wearable electronic device.

According to a first aspect, a method for controlling a running status of a wearable electronic device is provided, where the method includes: determining a posture change status of a wearable electronic device; and controlling a running status of the wearable electronic device according to the posture change status.

Optionally, the wearable electronic device is associated with a mobile phone and receives a motion sensor signal sent by the mobile phone; and the determining a posture change status of a wearable electronic device includes: determining, according to a case in which the motion sensor signal is detected, that a posture of the wearable electronic device changes; or determining, according to a case in which the motion sensor signal is not detected within a time period, that a posture of the wearable electronic device does not change.

Optionally, the wearable electronic device is associated with a mobile phone and receives a motion sensor signal sent by the mobile phone; and the determining a posture change status of a wearable electronic device includes: determining, according to a case in which a first motion sensor signal is detected, that a posture of the wearable electronic device changes; or determining, according to a case in which a second motion sensor signal is detected, that a posture of the wearable electronic device does not change.

Optionally, the wearable electronic device is associated with a mobile phone and receives a motion sensor signal sent by the mobile phone; and the determining a posture change status of a wearable electronic device includes: determining, according to a case in which a change value of the motion sensor signal is greater than a threshold within a time period, that a posture of the wearable electronic device changes; or determining, according to a case in which a change value of the motion sensor signal is less than a threshold within a time period, that a posture of the wearable electronic device does not change.

Optionally, the controlling a running status of the wearable electronic device according to the posture includes: enabling, according to a case in which the posture of the wearable electronic device changes, the wearable electronic device to enter a standby state from a working state or keep a standby state; or enabling, according to a case in which the posture of the wearable electronic device does not change, the wearable electronic device to enter a working state from a standby state or keep a working state.

Optionally, the mobile phone is built in the wearable electronic device or attached outside the wearable electronic device.

According to a second aspect, an apparatus for controlling a running status of a wearable electronic device is provided, where the apparatus includes a processing unit that is configured to: determine a posture change status of a wearable electronic device; and control a running status of the wearable electronic device according to the posture change status.

Optionally, the wearable electronic device is associated with a mobile phone, the apparatus includes a receiving module that is configured to receive a motion sensor signal sent by the mobile phone; and the determining a posture change status of a wearable electronic device includes: determining, according to a case in which the motion sensor signal is detected, that a posture of the wearable electronic device changes; or determining, according to a case in which the motion sensor signal is not detected within a time period, that a posture of the wearable electronic device does not change.

Optionally, the wearable electronic device is associated with a mobile phone, the apparatus includes a receiving module that is configured to receive a motion sensor signal sent by the mobile phone; and the determining a posture change status of a wearable electronic device includes: determining, according to a case in which a first motion sensor signal is detected, that a posture of the wearable electronic device changes; or determining, according to a case in which a second motion sensor signal is detected, that a posture of the wearable electronic device does not change.

Optionally, the wearable electronic device is associated with a mobile phone, the apparatus includes a receiving module that is configured to receive a motion sensor signal sent by the mobile phone; and the determining a posture change status of a wearable electronic device includes: determining, according to a case in which a change value of the motion sensor signal is greater than the threshold within a time period, that a posture of the wearable electronic device changes; or determining, according to a case in which a change value of the motion sensor signal is less than the threshold within a time period, that a posture of the wearable electronic device does not change.

Optionally, the processing unit is further configured to: enable, according to a case in which the posture of the wearable electronic device changes, the wearable electronic device to enter a standby state from a working state or keep a standby state; or enable, according to a case in which the posture of the wearable electronic device does not change, the wearable electronic device to enter a working state from a standby state or keep a working state.

Optionally, the mobile phone is built in the wearable electronic device or attached outside the wearable electronic device.

According to a third aspect, a wearable electronic device is provided, where the wearable electronic device includes: a data interface, configured to receive a motion sensor signal sent by a mobile phone; and a processor, configured to: determine a posture change status of the wearable electronic device according to a status of the motion sensor signal received by the data interface; and control a running status of the wearable electronic device according to the posture change status.

Optionally, the determining a posture change status of the wearable electronic device according to a status of the motion sensor signal received by the data interface includes: determining, according to a case in which the motion sensor signal is detected, that a posture of the wearable electronic device changes; or determining, according to a case in which the motion sensor signal is not detected within a time period, that a posture of the wearable electronic device does not change.

Optionally, the determining a posture change status of the wearable electronic device according to a status of the motion sensor signal received by the data interface includes: determining, according to a case in which a first motion sensor signal is detected, that a posture of the wearable electronic device changes; or determining, according to a case in which a second motion sensor signal is detected, that a posture of the wearable electronic device does not change.

Optionally, the determining a posture change status of the wearable electronic device according to a status of the motion sensor signal received by the data interface includes: determining, according to a case in which a change value of the motion sensor signal is greater than a threshold within a time period, that a posture of the wearable electronic device changes; or determining, according to a case in which a change value of the motion sensor signal is less than a threshold within a time period, that a posture of the wearable electronic device does not change.

Optionally, the processor is further configured to: enable, according to a case in which the posture of the wearable electronic device changes, the wearable electronic device to enter a standby state from a working state or keep a standby state; or enable, according to a case in which the posture of the wearable electronic device does not change, the wearable electronic device to enter a working state from a standby state or keep a working state.

Optionally, the mobile phone is built in the wearable electronic device or attached outside the wearable electronic device.

The embodiments of the present invention provide a method and an apparatus for controlling a running status of a wearable electronic device, and a wearable electronic device. By using a gyroscope or an accelerometer that is disposed in a mobile phone associated with a wearable electronic device, the processing unit can monitor whether a user is using the wearable electronic device, without using a light sensor, so as to reduce costs of the wearable electronic device. The mobile phone may be located inside the wearable electronic device, or may be attached outside the wearable electronic device. In the embodiments of the present invention, a gyroscope or an accelerometer may alternatively be installed in the wearable electronic device.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions in the present invention may be applied to various wearable electronic devices, such as a VR helmet, VR glasses, or other wearable VR devices.

Figure 1:
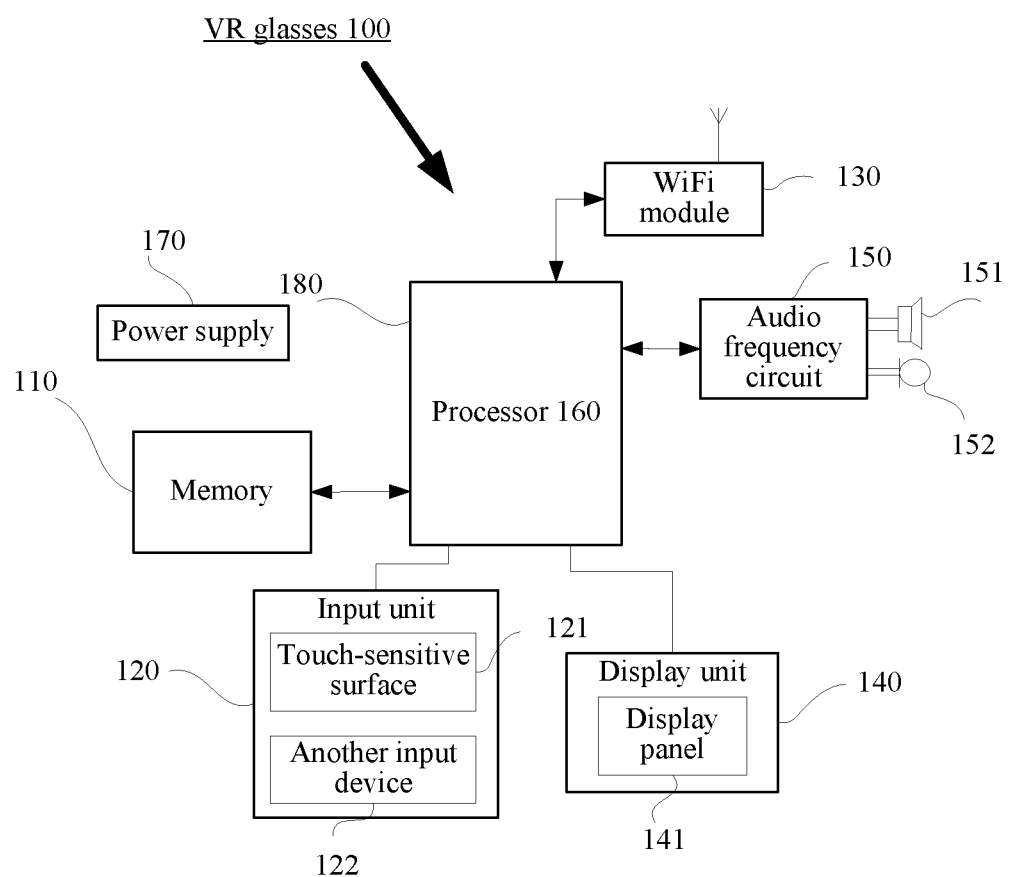
FIG. 1 is a schematic structural diagram of a terminal device that is applicable to a method and an apparatus for controlling a running status of a wearable electronic device according to an embodiment of the present invention.

The following first describes, by using VR glasses 100 shown in FIG. 1 as an example, a wearable electronic device applicable to the present invention. In the embodiments of the present invention, the VR glasses 100 may include components such as a memory 110, an input unit 120, a Wireless Fidelity (WiFi, wireless fidelity) module 130, a display unit 140, an audio frequency circuit 150, a processor 160, and a power supply 170.

A person skilled in the art can understand that a structure of the VR glasses 100 shown in FIG. 1 is merely an example but does not constitute any limitation, and the VR glasses 100 may include components more or fewer than those shown in the figure, a combination of some components, or components disposed differently. In addition, the VR glasses 100 in the embodiments of the present invention may be used to watch a video on a mobile phone. The mobile phone may be built in the VR glasses 100 or may be attached outside the VR glasses 100.

Figures 2, 3:
FIG. 2 is a schematic diagram of an application scenario according to an embodiment of the present invention.
FIG. 3 is a schematic flowchart of a method for controlling a running status of a wearable electronic device according to an embodiment of the present invention.

As shown in FIG. 2, a mobile phone is fastened outside VR glasses, and the VR glasses may receive motion sensor information sent by the mobile phone, so that a motion sensor in the mobile phone may be used to determine whether a user is using the VR glasses, without a need to configure a light sensor in the VR glasses. This reduces manufacturing costs of the VR glasses.

Referring to FIG. 1, the memory 110 may be configured to store a software program and a module. The processor 160 performs various functions and applications of the VR glasses 100 and data processing by running the software program and the module that are stored in the memory 110. The memory 110 may mainly include a program storage area and a data storage area. The program storage area may store an operating system, an application program required by at least one function (such as a voice playback function and an image playback function), and the like. The data storage area may store data (such as audio data) created according to use of the VR glasses 100, and the like. In addition, the memory 110 may include a high-speed random access memory, and may further include a non-volatile memory such as a disk storage device, a flash memory device, or another volatile storage device.

The input unit 120 may be configured to receive input digital or character information and generate a key signal related to user setting and function control of the VR glasses 100. Specifically, the input unit 120 may include a touch-sensitive surface 121 and another input device 122. The touch-sensitive surface 121, also referred to as a touch-screen, may collect a touch operation (such as an operation performed by a user on the touch-sensitive surface 121 or near the touch-sensitive surface 121 by using any proper object or accessory, such as a finger or a stylus) performed by the user on or near the touch-sensitive surface 121, and drive a corresponding connection apparatus according to a preset program. Optionally, the touch-sensitive surface 121 may include two parts: a touch detection apparatus and a touch controller. The touch detection apparatus detects a touch direction of the user, detects a signal generated by a touch operation, and transmits the signal to the touch controller. The touch controller receives touch information from the touch detection apparatus, converts the touch information into contact coordinates, sends the contact coordinates to the processor 160, and can receive and execute a command sent by the processor 160. In addition, the touch-sensitive surface 121 may be implemented by using multiple types, such as a resistive type, a capacitive type, an infrared type, and a surface acoustic wave type. In addition to the touch-sensitive surface 121, the input unit 120 may include the another input device 122. Specifically, the another input device 122 may include but is not limited to one or more of a physical keyboard, a function key (such as a volume control key or an on off key), a trackball, a mouse, or a joystick.

The display unit 140 may be configured to display information entered by the user or information provided for the user and various menus of the VR glasses 100. The display unit 140 may include a display panel 141. Optionally, the display panel 141 may be configured in a form of a liquid crystal unit (LCD. Liquid Crystal Display), an organic light-emitting diode (OLED, Organic Light-Emitting Diode), or the like. Further, the touch-sensitive surface 121 may cover the display panel 141. After detecting a touch operation on or near the touch-sensitive surface 121, the touch-sensitive surface 121 transmits information about the touch operation to the processor 160 to determine a touch event type, and then the processor 160 provides corresponding visual output on the display panel 141 according to the touch event type.

In addition, human eyes can identify a location on the display panel 141, and input may be performed according to a focal point on which human eyes concentrate or a blink action. Therefore, in FIG. 1, the touch-sensitive surface 121 and the display panel 141 are used as two independent components to implement input and output functions of the VR glasses 100. However, in some embodiments, the touch-sensitive surface 121 and the display panel 141 may be integrated to implement the input and output functions of the VR glasses 100.

The audio frequency circuit 150, a loudspeaker 151, and a microphone 152 may provide an audio interface between the user and the VR glasses 100. The audio frequency circuit 150 may transmit, to the loudspeaker 151, an electrical signal that is obtained after conversion of received audio data, and the loudspeaker 151 converts the electrical signal into a sound signal and outputs the sound signal. In addition, the microphone 152 converts a collected sound signal into an electrical signal; the audio frequency circuit 150 receives and converts the electrical signal into audio data, and outputs the audio data to the processor 160 for processing; and then processed audio data is sent to, for example, another VR device by using the WiFi module 130, or the audio data is output to the memory 110 for further processing.

WiFi belongs to a short-distance wireless transmission technology. By using the WiFi module 130, the VR glasses 100 may help the user receive and send an email, browse a webpage, access streaming media, and the like. The WiFi module 130 provides wireless broadband Internet access for the user. Although FIG. 1 shows the WiFi module 130, it can be understood that the WiFi module 130 is not a mandatory constituent of the VR glasses 100 and may be totally omitted as required without changing the essence scope of the present invention.

The processor 160 is a control center of the VR glasses 100, is connected to all the parts of the entire VR glasses 100 by using various interfaces and lines, and executes various functions of the VR glasses 100 and data processing by running or executing the software program and/or the module that are/is stored in the memory 110 and by invoking data stored in the memory 110, so as to perform overall monitoring on the VR glasses 100. Optionally, the processor 160 may include one or more processing units.

The VR glasses 100 further include the power supply 170 (such as a battery) that supplies power to all the components. Preferably, the power supply may be logically connected to the processor 150 by using a power management system, so that functions such as charging and discharging management and power consumption management are implemented by using the power management system. Although not shown, the VR glasses 100 may further include a camera, a Bluetooth module, or the like. Details are not described herein.

It should be noted that, the VR glasses 100 shown in FIG. 1 are merely an example of a terminal device, and the present invention does not impose a specific limitation thereto. The present invention may be applied to a wearable electronic device such as a VR helmet, and the present invention does not impose any limitation thereto.

For ease of understanding and description, a method for controlling content display by the foregoing VR glasses 100 in the embodiments of the present invention is described in detail in the following.

FIG. 3 shows a schematic flowchart of a method 300 for controlling a running status of a wearable electronic device according to an embodiment of the present invention. As shown in FIG. 3, the method 300 includes the following steps:

S310. Determine a posture change status of a wearable electronic device.

S320. Control a running status of the wearable electronic device according to the posture change status.

Because a wearable electronic device (for example, VR glasses) is configured to obtain 3D display content, a user performs operations such as rotation during usage, and in this case, a posture change status of the VR glasses is that a posture changes. The posture refers to spatial orientation of the VR glasses, for example, may be an angle between the VR glasses and a gravity direction or between the VR glasses and a horizontal direction. The posture change status may be, for example, a change status of the angle between the VR glasses and the gravity direction or between the VR glasses and the horizontal direction, or the posture of the VR glasses may be described by using a parameter such as Euler angles in mechanics (for ease of description, the foregoing posture change statuses are collectively referred to as a "moving posture" in the following). If the user stops using the VR glasses, for example, takes off the VR glasses and places the VR glasses on a desk, the posture change status of the VR glasses is that a posture does not change (for ease of description, the foregoing posture change status is collectively referred to as a "stationary posture" in the following). It should be understood that, the descriptions of the "postures" are merely examples, and this embodiment of the present invention does not impose any limitation thereto. Any location change status of a VR device that can reflect whether a user is using the VR device shall fall within the protection scope of the present invention. Therefore, a processor may determine, according to the posture change status of the VR glasses, whether the user is using the VR glasses, and determine a running status of the VR glasses according to the status of using the VR glasses by the user. For example, after the user slops using the VR glasses, the processor controls, according to a stationary posture of the VR glasses, the VR glasses to enter a standby state. In this way, power consumption can be reduced, and a batten life of the VR glasses can be prolonged.

Optionally, in the method 300, the wearable electronic device is associated with a mobile phone and receives a motion sensor signal sent by the mobile phone; and the determining a posture change status of a wearable electronic device includes either of the following steps:

S311. Determine, according to a case in which the motion sensor signal is detected, that a posture of the wearable electronic device changes.

S312. Determine, according to a case in which the motion sensor signal is not detected within a time period, that a posture of the wearable electronic device does not change.

The processor may determine the posture change status of the VR glasses according to whether the motion sensor signal (for example, a gyroscope signal) is detected. For example, when the processor detects the motion sensor signal, it indicates that the user is using the VR glasses at this time. In this case, the VR glasses may be kept in a normal working state, or the VR glasses may be enabled to enter a normal working state from a standby state. If the processor does not detect the motion sensor signal within a time period (for example, a time threshold is ten seconds), it may be determined that the VR glasses are in a stationary posture, and the VR glasses may be enabled to enter a standby state from a normal working state or keep a standby posture all the time. Incorrect determining of the posture of the VR glasses by the processor can be prevented by setting a time threshold. This embodiment is merely an example for description, and this embodiment of the present invention does not impose any limitation thereto.

Optionally, in the method 300, the wearable electronic device is associated with a mobile phone and receives a motion sensor signal sent by the mobile phone; and the determining a posture change status of a wearable electronic device includes either of the following steps:

S313. Determine, according to a case in which a first motion sensor signal is detected, that a posture of the wearable electronic device changes.

S314. Determine, according to a case in which a second motion sensor signal is detected, that a posture of the wearable electronic device does not change.

When the VR glasses are in a moving state, a motion sensor may periodically send the first motion sensor signal to the processor. For example, the first motion sensor signal may be "1". The processor determines, according to the detected first motion sensor signal, that the VR device is in a moving state, and may keep the VR glasses in a normal working state or enable the VR glasses to enter a normal working state from a standby state. When the VR glasses are in a stationary state, the motion sensor may periodically send the second motion sensor signal to the processor. For example, the second motion sensor signal may be "0". The processor may determine, according to the detected second motion sensor signal, that the VR device is in a stationary state, and enable the VR glasses to enter a standby state from a normal working state or keep a standby posture all the time. This embodiment is merely an example for description, and this embodiment of the present invention does not impose any limitation thereto.

Optionally, in the method 300, the wearable electronic device is associated with a mobile phone and receives a motion sensor signal sent by the mobile phone; and the determining a posture change status of a wearable electronic device includes either of the following steps:

S315. Determine, according to a case in which a change value of the motion sensor signal is greater than a threshold within a time period, that a posture of the wearable electronic device changes.

S316. Determine, according to a case in which a change value of the motion sensor signal is less than a threshold within a time period, that a posture of the wearable electronic device does not change.

The processor may set a threshold for the motion sensor signal. If a change value of a characteristic (for example, a signal strength) of the motion sensor signal detected within a time period is greater than the threshold, it may be determined that the VR glasses are in a moving posture. If a change value of the motion sensor signal detected within a time period is less than the threshold, it may be determined that the VR glasses are in a stationary posture. If the processor does not detect the motion sensor signal within a time period, that is, the change value of the motion sensor signal is 0, it may also be considered that the change value of the motion sensor signal is less than the threshold. Therefore, incorrect determining of the posture of the VR glasses by the processor can be prevented. This embodiment is merely an example for description, and this embodiment of the present invention does not impose any limitation thereto. For example, two thresholds may alternatively be set for the motion sensor signal. When the change value of the signal strength is greater than a first threshold, the processor determines that the VR glasses are in a moving state; when the change value of the signal strength is less than a second threshold, the processor determines that the VR glasses are in a stationary state. The foregoing thresholds may be preset fixed values, or may be dynamic values adjustable by a user.

Optionally, the controlling a running status of the wearable electronic device according to the posture includes either of the following steps:

S321. Enable, according to a case in which the posture of the wearable electronic device changes, the wearable electronic device to enter a standby state from a working state or keep a standby state.

S322. Enable, according to a case in which the posture of the wearable electronic device does not change, the wearable electronic device to enter a working state from a standby state or keep a working state.

In this embodiment of the present invention, if the user stops using the VR glasses, the processor may disable a VR program according to the stationary posture, and enable the VR glasses to enter a standby state from a working state or keep a standby state. If the user continues to use the VR glasses, the processor may enable a VR program according to the moving posture, and enable the VR glasses to enter a working state from a standby state or keep a working state.

Optionally, the mobile phone is built in the wearable electronic device or attached outside the wearable electronic device.

For the VR glasses in this embodiment of the present invention, the mobile phone may be placed inside the VR glasses to watch a 3D video on the mobile phone. Therefore, the processor may receive the motion sensor signal from the mobile phone, and determine the posture of the VR glasses according to the motion sensor signal from the mobile phone.

Specifically, the motion sensor in the mobile phone may be an accelerometer or may be a gyroscope. In this embodiment of the present invention, the above-mentioned motion sensor may be used as an element for obtaining the motion sensor signal, but no limitation is imposed thereto. Other sensors that can be used for obtaining a motion sensor signal shall fall within the protection scope of the present invention. In addition, a working principle and a data processing process of the motion sensor may be similar to those in the prior art. Herein, to avoid repetition, elaboration thereof is omitted.

Figure 4:
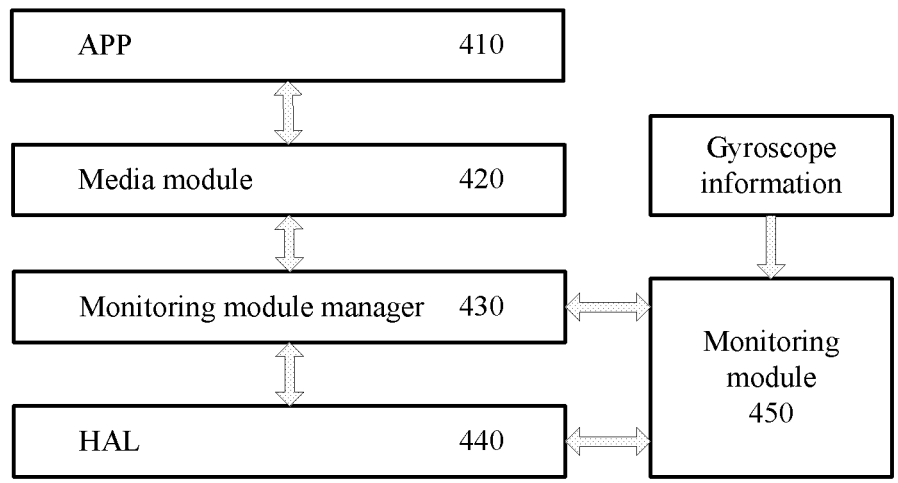
FIG. 4 is another schematic flowchart of a method, for controlling a running status of a wearable electronic device, applicable to an embodiment of the present invention.

FIG. 4 shows another schematic flowchart of a method, for controlling a running status of a wearable electronic device, applicable to an embodiment of the present invention.

As shown in FIG. 4, a wearable electronic device, such as VR glasses, includes an HAL (Hardware Abstraction Layer, hardware abstraction layer) 410, a monitoring module manager (SenseFlinger) 420, a media module (MediaRecord) 430, an application program APP 440, and a monitoring module (Sense) 450. The units are connected by using an API (Application Programming Interface, application programming interface). The monitoring module 450 obtains gyroscope information of a mobile phone, and sends the gyroscope information to the monitoring module manager 420 and the HAL 410. After the HAL 410 obtains the gyroscope information (that is, a motion sensor signal), the monitoring module manager 420 may perform the determining step in the method 300. If determining that the VR glasses are in a stationary posture, the HAL 410 may enable the media module 430 and the APP 440 to enter a standby state or keep the media module 430 and the APP 440 in a standby state; if determining that the VR glasses are in a moving posture, the HAL 410 may enable the media module 430 and the APP 440 to enter a working state or keep the media module 430 and the APP 440 in a working state.

Therefore, according to the method 400 for controlling a running status of a wearable electronic device in this embodiment of the present invention, the posture of the wearable electronic device is monitored by using the motion sensor signal (for example, the gyroscope signal from the mobile phone), whether a user is using the wearable electronic device is determined, and the running status of the wearable electronic device is determined without using a light sensor. This can reduce manufacturing costs of the wearable electronic device.

Figure 5:
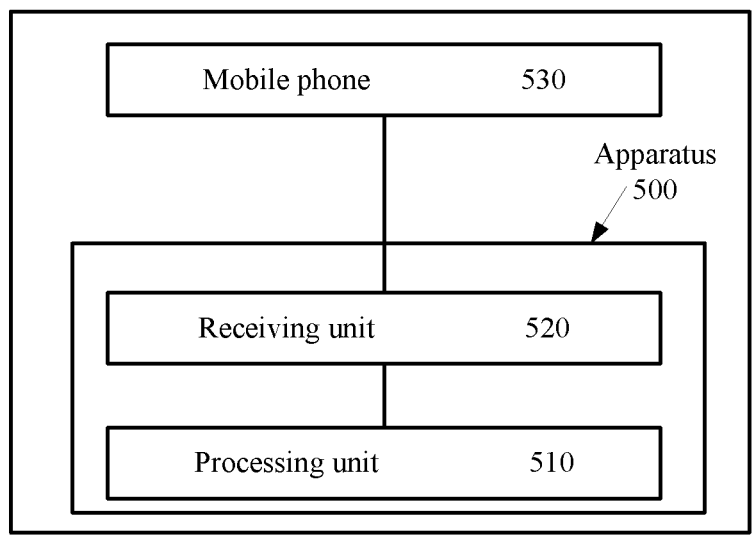
FIG. 5 is a schematic structural diagram of an apparatus for controlling a running status of a wearable electronic device according to an embodiment of the present invention.

FIG. 5 is a schematic structural diagram of an apparatus for controlling a running status of a wearable electronic device according to an embodiment of the present invention. As shown in FIG. 5, the apparatus 500 includes:

a processing unit 510, configured to: determine a posture change status of a wearable electronic device; and control a running status of the wearable electronic device according to the posture.

Optionally, the wearable electronic device is associated with a mobile phone 530, and the apparatus 500 includes a receiving unit 520 that is configured to receive a motion sensor signal sent by the mobile phone; and the determining a posture change status of a wearable electronic device includes:

determining, according to a case in which the motion sensor signal is detected, that a posture of the wearable electronic device changes; or determining, according to a case in which the motion sensor signal is not detected within a time period, that a posture of the wearable electronic device does not change.

Optionally, the wearable electronic device is associated with a mobile phone 530, and the apparatus 500 includes a receiving unit 520 that is configured to receive a motion sensor signal sent by the mobile phone; and the determining a posture change status of a wearable electronic device includes:

determining, according to a case in which a first motion sensor signal is detected, that a posture of the wearable electronic device changes; or determining, according to a case in which a second motion sensor signal is detected, that a posture of the wearable electronic device does not change.

Optionally, the wearable electronic device is associated with a mobile phone 530, and the apparatus 500 includes a receiving unit 520 that is configured to receive a motion sensor signal sent by the mobile phone; and the determining a posture change status of a wearable electronic device includes:

determining, according to a case in which a change value of the motion sensor signal is greater than a threshold within a time period, that a posture of the wearable electronic device changes; or determining, according to a case in which a change value of the motion sensor signal is less than a threshold within a time period, that a posture of the wearable electronic device does not change.

Optionally, the processing unit 510 is further configured to:

enable, according to a case in which the posture of the wearable electronic device changes, the wearable electronic device to enter a standby state from a working state or keep a standby state; or enable, according to a case in which the posture of the wearable electronic device does not change, the wearable electronic device to enter a working state from a standby state or keep a working state.

Optionally, the mobile phone is built in the wearable electronic device or attached outside the wearable electronic device.

It should be understood that, that the mobile phone shown in FIG. 5 is located inside the wearable electronic device is merely an example for description. This embodiment of the present invention does not impose any limitation on a location of the mobile phone relative to the wearable electronic device. Any embodiment shall fall within the protection scope of the present invention provided that a posture change of the mobile phone can reflect a posture change of the wearable electronic device in the embodiment.

The apparatus 500 for controlling a running status of a wearable electronic device according to this embodiment of the present invention may be corresponding to an entity for executing the method 300 for controlling a running status of a wearable electronic device in the embodiment of the present invention. In addition, the units in the apparatus 500 and the foregoing other operations and/or functions are used to implement corresponding procedures of the method 300 in FIG. 3. For brevity, details are not described herein.

Therefore, according to the apparatus 500 for controlling a running status of a wearable electronic device in this embodiment of the present invention, the posture of the wearable electronic device is monitored by using the motion sensor signal (for example, a gyroscope signal from the mobile phone), whether a user is using the wearable electronic device is determined, and the running status of the wearable electronic device is determined without using a light sensor. This can reduce manufacturing costs of the wearable electronic device.

Figure 6:
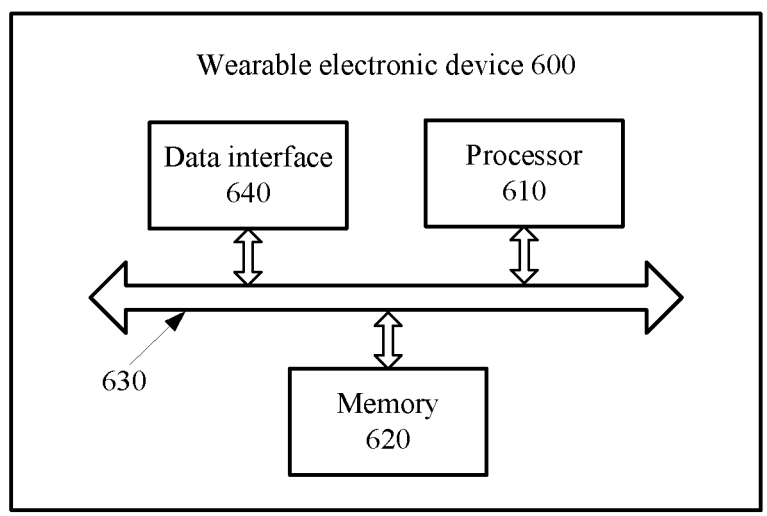
FIG. 6 is a schematic structural diagram of a wearable electronic device according to an embodiment of the present invention.

As shown in FIG. 6, an embodiment of the present invention further provides a wearable electronic device 600. The wearable electronic device 600 includes a processor 610, a memory 620, a bus system 630, and a data interface 640. The processor 610, the memory 620, and the data interface 640 are connected by using the bus system 630. The memory 620 is configured to store an instruction. The processor 610 is configured to execute the instruction stored in the memory 620, to control the data interface 640 to receive or send a signal.

The data interface 640 is configured to receive a motion sensor signal sent by a mobile phone. The processor 610 is configured to: determine a posture change status of the wearable electronic device 600 according to a status of the sensor signal received by the data interface 640; and control a running status of the wearable electronic device 600 according to the posture change status.

Therefore, according to the wearable electronic device 600 provided in this embodiment of the present invention, a posture of the wearable electronic device is monitored by using the motion sensor signal (for example, a gyroscope signal from the mobile phone), whether a user is using the wearable electronic device is determined, and the running status of the wearable electronic device is determined without using a light sensor. This can reduce manufacturing costs of the wearable electronic device.

In this embodiment of the present invention, the data interface 640 may be a USB (Universal Serial Bus, Universal Serial Bus) interface, may be a WiFi interface, or may be another interface that can be configured to receive the motion sensor signal sent by the mobile phone. This embodiment of the present invention does not impose any limitation thereto.

The processor 610 may implement or perform the steps disclosed in the embodiments of the present invention. The processor 610 may be a microprocessor, or the processor may be any conventional processor, a decoder, or the like. The steps of the methods disclosed with reference to the embodiments of the present invention may be directly implemented by a hardware processor, or may be implemented by a combination of hardware and a software module in a decoding processor. The software module may be located in a random access memory, a flash memory, a read-only memory, a programmable read-only memory or an electrically erasable programmable memory, a register, or another mature storage medium in the art. The storage medium is located in the memory, and the processor reads information in the memory and completes the steps in the foregoing methods in combination with hardware of the processor.

The processor 610 may be a central processing unit (Central Processing Unit, "CPU" for short), and the processor 610 may alternatively be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory may include a read-only memory and a random access memory, and provide an instruction and data for the processor 610. A part of the memory may further include a non-volatile random access memory. For example, the memory may further store device type information.

During implementation, the steps of the methods may be implemented by an integrated logical circuit of hardware in the processor 610 or by a software instruction. The steps of the methods disclosed with reference to the embodiments of the present invention may be directly implemented by a hardware processor, or may be implemented by a combination of hardware and a software module in a processor. The software module may be located in a random access memory, a flash memory, a read-only memory, a programmable read-only memory or an electrically erasable programmable memory, a register, or another mature storage medium in the art.

Optionally, the processor 610 is further configured to: determine, according to a case in which the motion sensor signal is detected, that a posture of the wearable electronic device changes; or determine, according to a case in which the motion sensor signal is not detected within a time period, that a posture of the wearable electronic device does not change.

Optionally, the processor 610 is further configured to: determine, according to a case in which a first motion sensor signal is detected, that a posture of the wearable electronic device changes; or determine, according to a case in which a second motion sensor signal is detected, that a posture of the wearable electronic device does not change.

Optionally, the processor 610 is further configured to: determine, according to a case in which a change value of the motion sensor signal is greater than a threshold within a time period, that a posture of the wearable electronic device changes; or determine, according to a case in which a change value of the motion sensor signal is less than a threshold within a time period, that a posture of the wearable electronic device does not change.

Optionally, the processor 610 is further configured to: enable, according to a case in which the posture of the wearable electronic device changes, the wearable electronic device to enter a standby state from a working state or keep a standby state; or enable, according to a case in which the posture of the wearable electronic device does not change, the wearable electronic device to enter a working state from a standby state or keep a working state.

Optionally, the mobile phone is built in the wearable electronic device or attached outside the wearable electronic device.

The wearable electronic device 600 provided in this embodiment of the present invention may be corresponding to an entity for executing the method 300 for controlling a running status of a wearable electronic device in the embodiment of the present invention. In addition, the units in the wearable electronic device 600 and the foregoing other operations and or functions are used to implement corresponding procedures of the method 300 in FIG. 3. For brevity, details are not described herein.

According to the wearable electronic device 600 in this embodiment of the present invention, the posture of the wearable electronic device is monitored by using the motion sensor signal (for example, a gyroscope signal from the mobile phone), whether a user is using the wearable electronic device is determined, and the running status of the wearable electronic device is determined without using a light sensor. This can reduce manufacturing costs of the wearable electronic device.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or at least two units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM, Read-Only Memory), a random access memory (RAM. Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for controlling a running status of a wearable electronic device, the method comprising:
receiving a first motion sensor signal from a mobile phone;
determining a magnitude of the first motion sensor signal;
determining whether the magnitude of the first motion sensor signal satisfies a first threshold;
responsive to determining that the magnitude of the first motion sensor signal satisfies the first threshold, determining a posture change status of the wearable electronic device comprising the steps of:
determining that a posture of the wearable electronic device has changed when a change value of the first motion sensor signal is greater than a second threshold and that the first motion sensor signal is received within a time period; and
determining that the posture of the wearable electronic device has not changed when the change value of the first motion sensor signal is less than the second threshold within the time period; and
controlling the running status of the wearable electronic device according to the posture change status.

2. The method of claim 1, wherein determining the posture change status of the wearable electronic device further comprises determining that the posture of the wearable electronic device has not changed when the first motion sensor signal is not detected within a predetermined time period.

3. The method of claim 2, wherein the mobile phone is integrated in the wearable electronic device.

4. The method of claim 2, wherein the mobile phone is attached to an outside of the wearable electronic device.

5. The method of claim 1, wherein determining the posture change status of the wearable electronic device further comprises determining that the posture of the wearable electronic device has not changed when a second motion sensor signal is detected.

6. The method of claim 1, wherein controlling the running status of the wearable electronic device comprises:
   causing the wearable electronic device to enter a standby state from a working state or to remain in the standby state when the posture of the wearable electronic device has changed; and
   causing the wearable electronic device to enter the working state from the standby state or to remain in the working state when the posture of the wearable electronic device has not changed.

7. An apparatus for controlling a running status of a wearable electronic device, the apparatus comprising:
   a memory comprising instructions; and
   a processor coupled to the memory and to a receiver, wherein the instructions are configured to cause the apparatus to be configured to:
      receive a first motion sensor signal from a mobile phone;
      determine a magnitude of the first motion sensor signal;
      determine whether the magnitude of the first motion sensor signal satisfies a first threshold;
      responsive to determining that the magnitude of the first motion sensor signal satisfies the first threshold, determine a posture change status of the wearable electronic device by:
         determining that a posture of the wearable electronic device has changed when a change value of the first motion sensor signal is greater than a second threshold and that the first motion sensor signal is received within a time period; and
         determining that the posture of the wearable electronic device has not changed when the change value of the first motion sensor signal is less than the second threshold within the time period; and
      control the running status of the wearable electronic device according to the posture change status.

8. The apparatus of claim 7, wherein the wearable electronic device is associated with the mobile phone, wherein the apparatus further comprises a receiver that is coupled to the memory and the processor and that is configured to receive the first motion sensor signal from the mobile phone, and wherein the instructions are further configured to cause the apparatus to determine the posture change status of the wearable electronic device by causing the apparatus to be configured to determine that the posture of the wearable electronic device has not changed when the first motion sensor signal is not detected within a time period.

9. The apparatus of claim 8, wherein the mobile phone is integrated in the wearable electronic device.

10. The apparatus of claim 8, wherein the mobile phone is attached to an outside of the wearable electronic device.

11. The apparatus of claim 7, wherein the apparatus further comprises a receiver that is coupled to the memory and the processor and that is configured to receive the first motion sensor signal from the mobile phone, and wherein the instructions are configured to cause the apparatus to determine the posture change status of the wearable electronic device by causing the apparatus to be configured to determine that the posture of the wearable electronic device has not changed when a second motion sensor signal is detected.

12. The apparatus of claim 7, wherein the instructions further cause the apparatus to be configured to:
   enable the wearable electronic device to enter a standby state from a working state or to remain in the standby state when the posture of the wearable electronic device has changed; and
   enable the wearable electronic device to enter the working state from the standby state or to remain in the working state when the posture of the wearable electronic device has not changed.

13. A wearable electronic device, comprising:
   a data interface configured to receive a first motion sensor signal from a mobile phone; and
   a processor coupled to the data interface and configured to:
      determine a magnitude of the first motion sensor signal;
      determine whether the magnitude of the first motion sensor signal satisfies a first threshold;
      responsive to determining that the magnitude of the first motion sensor signal satisfies the first threshold, determine a posture change status of the wearable electronic device at least in part by determining that a posture of the wearable electronic device has changed by:
         determining that a posture of the wearable electronic device has changed when a change value of the first motion sensor signal is greater than a second threshold and that the first motion sensor signal is received within a time period; and
         determining that the posture of the wearable electronic device has not changed when the change value of the first motion sensor signal is less than the second threshold within the time period; and
      control a running status of the wearable electronic device according to the posture change status.

14. The wearable electronic device of claim 13, wherein the processor is further configured to determine the posture change status of the wearable electronic device by being configured to determine that the posture of the wearable electronic device has not changed when the first motion sensor signal is not detected within a time period.

15. The wearable electronic device of claim 14, wherein the processor is further configured to:
   enable the wearable electronic device to enter a standby state from a working state or to remain in the standby state when the posture of the wearable electronic device has changed; and
   enable the wearable electronic device to enter the working state from the standby state or to remain in the working state when the posture of the wearable electronic device has not changed.

16. The wearable electronic device of claim 13, wherein the processor is further configured to determine the posture change status of the wearable electronic device by being configured to determine that the posture of the wearable electronic device has not changed when a second motion sensor signal is detected.

17. The wearable electronic device of claim 16, wherein the processor is further configured to:
   enable the wearable electronic device to enter a standby state from a working state or to remain in the standby state when the posture of the wearable electronic device has changed; and enable the wearable electronic device to enter the working state from the standby state or to remain in the working state when the posture of the wearable electronic device has not changed.

18. The wearable electronic device of claim 13, wherein the processor is further configured to:
   enable the wearable electronic device to enter a standby state from a working state or to remain in the standby state when the posture of the wearable electronic device has changed; and
   enable the wearable electronic device to enter the working state from the standby state or to remain in the working state when the posture of the wearable electronic device has not changed.

19. The wearable electronic device of claim 13, wherein the mobile phone is integrated in the wearable electronic device.

20. The wearable electronic device of claim 13, wherein the mobile phone is attached to an outside of the wearable electronic device.

\* \* \* \* \*